Figure 1:
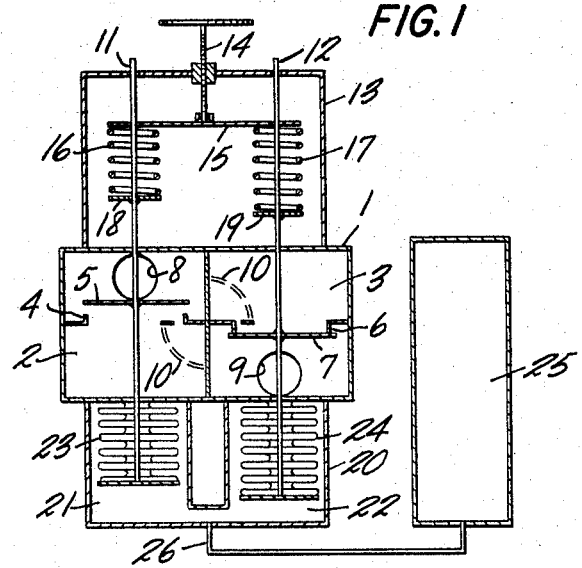

3,189,275
HEATING AND COOLING PLANT
Carl Sørensen and Helmar Trøst Nielsen, Nordborg, Denmark, assignors to Danfoss ved ing. M. Clausen, Nordborg, Denmark, a company of Denmark
Filed Oct. 4, 1961, Ser. No. 142,808
Claims priority, application Germany, Oct. 6, 1960, D 34,437
6 Claims. (Cl. 236—1)

This invention relates to heating and cooling installations of the type employed for the heating and cooling of rooms of buildings.

Conventional heating and cooling installations have heat exchangers with a flow pipe which either is fed with a heating medium during the winter, or a cooling medium during the summer. Such installations are, however, disadvantageous during the transition periods between summer and winter or when it is desired to heat the rooms on the north side of a building and to cool the rooms on the south side of the same building, or in hotels where the same rooms are used both as living rooms where higher temperatures are desired and as bedrooms where lower temperatures are desired. To avoid these difficulties it has recently been proposed to provide the heat exchangers in such installations with a first flow pipe for the heating medium and a second flow pipe for the cooling medium, in an effort to make it possible either to heat or to cool the rooms.

The present invention is particularly concerned with a heating and cooling installation of the latter type and it is the object of the invention to provide a construction which makes possible automatic control of a fixed and predetermined temperature value.

The object of the invention is achieved by a construction which includes a thermostatic heating valve disposed between the first flow pipe and the heat exchanger, and a thermostatic cooling valve disposed between the second flow pipe and the heat exchanger, whereby the temperature control of both valves is substantially identical.

A continuous control is obtained by this construction since both the heating and the cooling operations freely merge with each other. Thus, both valves are closed at the fixed and predetermined temperature value desired. If the temperature falls below this value, the heating valve opens; and the cooling valve opens if the temperature rises above this value.

Both valves suitably have a common adjustment control so that it is assured that a simultaneous opening of both valves does not occur because of different adjustments in the two valves, so that no over-flow of the heating or cooling medium from one pipe to another will take place by reason of pressure differences in the two flow pipes.

The operating devices of the two valves may have a common temperature sensor, thus achieving not only a decrease in construction costs but also assuring that both operating devices will be influenced by the same temperature, so that both valves will be closed if the temperature sensed by the sensor is equal to the pre-set desired temperature.

In the simplest embodiment both valves are contained in a common housing. It is advantageous to fill the system, consisting of sensor and operating devices, only partly with liquid. Thus, in contrast to the completely liquid-charged system, a volume adjustment control and the ordinary safety spring can be eliminated. Further, in the completely filled system, the operating device must be thermally insulated from the heating or cooling medium so that a further influence on the temperature does not occur. In the above-mentioned case, when the operating devices are not thermally insulated, care must be taken that the operating devices do not adopt the temperature of the medium flowing through the system, i.e. the heating or the cooling medium, which may cause various condensing effects on the vapor of the liquid in the devices. This inconvenience is avoided in accordance with the invention by providing a volume of liquid in the system which is less than the volume of the sensor but greater than the total volume of the operating devices.

Figure 2:
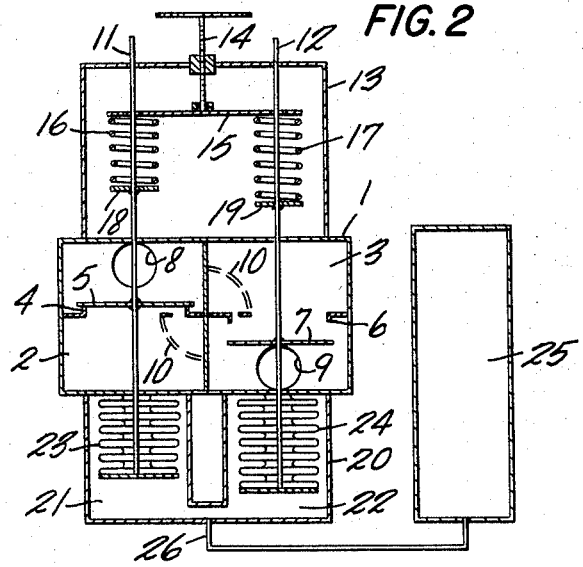

Further characteristics of the invention will appear from the following detailed description of an illustrative embodiment taken in connection with the accompanying drawing, wherein, FIG. 1 is a diagrammatic sectional view of a heating and cooling installation involving a combined valve assembly in accordance with the present invention, the parts being shown in the positions assumed during the cooling period; and FIG. 2 is a similar view showing the position of parts during a heating period.

Referring to the drawing, a valve housing 1 has two separate chambers 2 and 3, the former being provided with a valve seat 4 and a valve body 5, and the latter being provided with a valve seat 6 and a valve body 7. As will be seen, the valves open in opposite directions. Chamber 2 is connected with a flow pipe 8 for the cooling medium, and chamber 3 is connected with a flow pipe 9 for the heating medium. Both chambers communicate, through the common connection pipe 10, shown in broken lines, to the heat exchanger (not shown). The valves are provided with valve stems 11 and 12, respectively.

The housing 1 has an upper extension 13 through which the valve stems extend and extension 13 receives an adjusting screw 14. Screw 14 acts upon a crossbar 15, which is effective to alter the initial tension of springs 16 and 17. The spring 16 surrounds valve stem 11 and presses upon an abutment 18 on valve stem 11. In like manner, spring 17 surrounds valve stem 12 and presses upon an abutment 19 on valve stem 12.

On the underside of housing 1 there is a lower extension 20 defining two chambers which house two operators or bellows 23 and 24 which serve as operating members. The bellows 23 and 24 are connected with the valve stems 11 and 12, respectively. A temperature sensor 25 is connected by means of a capillary tube 26 with chambers 21 and 22. The sensor 25 is normally disposed in the room to be controlled.

The entire system is adjusted so that both valves 4, 5 and 6, 7 are closed when the temperature measured by the sensor 25 (primary value) is equal to the desired pre-set temperature value established by the adjustment screw 14 (secondary temperature). If the primary temperature in the temperature-controlled room rises, the vapor pressure of the fluid in the sensor 25 rises and the pressure variation in chambers 21, 22 causes an opening of the valves 4, 5 to admit the cooling medium.

The total work capacity of the sensor system in this case influences only the bellows 23 of valve 4, 5 because the bellows 24, owing to the fact that the valve body 7 presses against its seat 6, is locked in this direction. Through pipe 10 the cooling medium now flows to the heating unit (not shown) to cool the room until sensor 25 again registers the pre-set temperature and closes the valve 4, 5. On the other hand, when the room temperature which is to kept constant falls, the vapor pressure in chambers 21, 22 decreases so that the valve 6, 7 opens and admits the heating medium. In this case, the total alteration in volume produced by the feeler or sensor influences the bellows 24, because bellows 23, owing to the fact that the valve body 5 presses against seat 4, is locked in this direction. When the room temperature has been sufficiently raised and the feeler 25 registers the pre-set desired temperature, it causes the valve 6, 7 to close.

By turning the adjusting screw 14, the initial tension of springs 16 and 17 can be simultaneously varied so that the pre-set value, above which valve 4, 5 will open and under which valve 6, 7 will open can be set as required. To obtain a generally continuous control of the temperature, the setting of the temperature adjustment for the two valves 4, 5 and 6, 7 must be substantially identical, i.e. the valve 4, 5 should open at or slightly above the desired temperature, the valve 6, 7 should open at or slightly below the desired temperature, as established by the setting of the adjustment screw 14. Overlapping of the two opening conditions should be avoided so that the heating and cooling media do not mix.

In the embodiment illustrated and described, the thermostatic system, involving the feeler 25 and the operating members (bellows 23, 24), operates on a liquid and vapor charge, via a mixture of liquid and vapor. In this case, safety springs which react to excess loads are not necessary. If care is taken that the volume of the liquid is less than the volume of sensor 25 but greater than the total volume of chambers 21 and 22, the various problems of vapor condensation, which may occur in the combined valve if the valve housing and the associated components are influenced partly by the cooling medium and partly by the heating medium, are effectively controlled. It will be understood that the several individual components of the system illustrated, e.g. the bellows, the sensor, the springs, the valve elements, etc., are suitably of conventional construction. A typical sensor, for example, is described in British Patent 758,-386 and the use of a typical liquid and vapor charge is described in German published application 1,070,426.

It will be understood that various changes and modifications may be made in the embodiment described above and illustrated in the drawing without departing from the scope of the invention as defined in the appended claims. For example, instead of the adjustment system for the predetermined pre-set temperature embodying the adjustment screw 14, use can be made of operating systems which are completely filled with liquid and these can be provided with a device of known type for changing the volume of the liquid in the system, as described, for example in German published applications 1,064,268 and 1,049,131.

It is intended, therefore, that all matter contained in the foregoing description and in the drawing shall be interpreted as illustrative only and not as limitative of the invention.

We claim:

1. A thermostatic valve system for thermostatically controlling and regulating a heating flow and a cooling flow comprising, a unit for controlling and regulating heating and cooling flows, said unit having inlet means and outlet means for inflow and outflow of a cooling flow and a heating flow, a pair of alternately operable valves comprising a heating flow control valve and a cooling flow control valve in said unit each operable to an open and a closed condition for respectively controlling flow of said heating flow and said cooling flow through said inlet means and out of said outlet means, a thermostatic system comprising sensing means for sensing temperature variations of a temperature to be controlled and for controlling said valves in dependence upon said temperature being sensed and the variations thereof, valve operating means connected in common to said sensing means and responsive to said sensing means for operating said valves independently and alternately in dependence upon whether said temperature being sensed is above a given temperature level or below said given temperature level, said operating means comprising means for opening said cold flow control valve when said given temperature level of said temperature being sensed is exceeded and for closing said cold flow control valve when said given temperature level obtains and for maintaining said cold flow control valve closed when said temperature being sensed is below said given temperature level, and said valve operating means comprising means to close said heating flow control valve when said temperature level obtains and is exceeded and for opening the last-mentioned valve when said temperature being sensed has a value less than said temperature level.

2. A thermostatic valve system according to claim 1, in which valve operating means comprises, for each of said valves a fluid-actuated operator and in which said sensing means comprises a fluid-containing, thermostatic sensor comprising a temperature-responsive fluid, said sensor and the operators defining a fluid-containing space greater than a fluid containing space of said sensor and greater than the fluid containing space of said operators.

3. A thermostatic valve system for thermostatically controlling and regulating a heating flow and a cooling flow comprising, a unit for controlling and regulating heating and cooling flows, said unit having inlet means and outlet means for inflow and outflow of a cooling flow and a heating flow, a pair of alternately operable valves comprising a heating flow control valve and a cooling flow control valve in said unit each operable to an open and a closed condition for respectively controlling flow of said heating flow and said cooling flow through said inlet means and out of said outlet means, a thermostatic system comprising a single sensor for sensing temperature variations of a temperature to be controlled and for controlling said valves in dependence upon said temperature being sensed and the variations thereof, valve operating means connected in common to said sensor and responsive to said sensor for operating said valves independently and alternately in dependence upon whether said temperature being sensed is above a given temperature level or below said given temperature level, said operating means comprising means for opening said cold flow control valve when said given temperature level of said temperature being sensed is exceeded and for closing said cold flow control valve when said given temperature level obtains and for maintaining said cold flow control valve closed when said temperature being sensed is below said given temperature level, and said valve operating means comprising means to close said heating flow control valve when said temperature level obtains and is exceeded and for opening the last-mentioned valve when said temperature being sensed has a value less than said temperature level.

4. A thermostatic valve system for thermostatically controlling and regulating a heating flow and a cooling flow comprising, a unit for controlling and regulating heating and cooling flows, said unit having inlet means and outlet means for inflow and outflow of a cooling flow and a heating flow, a pair of alternately operable valves comprising a heating flow control valve and a cooling flow control valve in said unit each operable to an open and a closed condition for respectively controlling flow of said heating flow and said cooling flow through said inlet means and out of said outlet means, means defining a common housing for said valves, a thermostatic system comprising sensing means for sensing temperature variations of a temperature to be controlled and for controlling said valves in dependence upon said temperature being sensed and the variations thereof, valve operating means connected in common to said sensing means and responsive to said sensing means for operating said valves independently and alternately in dependence upon whether said temperature being sensed is above a given temperature level or below said given temperature level, said operating means comprising means for opening said cold flow control valve when said given temperature level of said temperature being sensed is exceeded and for closing said cold flow control valve when said given temperature level obtains and for maintaining said cold flow control valve closed when said temperature being sensed is below said given temperature level, and said valve operating means comprising means to close said heating flow control valve when said temperature level obtains and is exceeded and for opening the last-mentioned valve when said temperature being sensed has a value less than said temperature level.

5. A thermostatic valve system for thermostatically controlling and regulating a heating flow and a cooling flow comprising, a unit for controlling and regulating heating and cooling flows, said unit having inlet means and outlet means for inflow and outflow of a cooling flow and a heating flow, a pair of alternately operable valves comprising a heating flow control valve and a cooling flow control valve in said unit each operable to an open and a closed condition for respectively controlling flow of said heating flow and said cooling flow through said inlet means and out of said outlet means, means defining a common housing for said valves, a thermostatic system comprising a single sensor for sensing temperature variations of a temperature to be controlled and for controlling said valves in dependence upon said temperature being sensed and the variations thereof, valve operating means connected in common to said sensor and responsive to said sensor for operating said valves independently and alternately in dependence upon whether said temperature being sensed is above a given temperature level or below said given temperature level, said operating means comprising means for opening said cold flow control valve when said given temperature level of said temperature being sensed is exceeded and for closing said cold flow control valve when said given temperature level obtains and for maintaining said cold flow control valve closed when said temperature being sensed is below said given temperature level, and said valve operating means comprising means to close said heating flow control valve when said heating temperature level obtains and is exceeded and for opening the last-mentioned valve when said temperature being sensed has a value less than said temperature level.

6. A thermostatic valve system for thermostatically controlling and regulating a heating flow and a cooling flow comprising, a unit for controlling and regulating heating and cooling flows, said unit having inlet means and outlet means for inflow and outflow of a cooling flow and a heating flow, a pair of alternately operable valves comprising a heating flow control valve and a cooling flow control valve in said unit each operable to an open and a closed condition for respectively controlling flow of said heating flow and said cooling flow through said inlet means and out of said outlet means, a thermostatic system comprising sensing means for sensing temperature variations of a temperature to be controlled and for controlling said valves in dependence upon said temperature being sensed and the variations thereof, valve operating means connected in common to said sensing means and responsive to said sensing means for operating said valves independently and alternately in dependence upon whether said temperature being sensed is above a given temperature level or below said given temperature level, said operating means comprising means for opening said cold flow control valve when said given temperature level of said temperature being sensed is exceeded and for closing said cold flow control valve when said given temperature level obtains and for maintaining said cold flow control valve closed when said temperature being sensed is below said given temperature level, said valve operating means comprising means to close said heating flow control valve when said temperature level obtains and is exceeded and for opening the last-mentioned valve when said temperature being sensed has a value less than said temperature level, said valve operating means comprising a pair of operators and springs cooperating therewith, means operably connected to said operators and springs to jointly simultaneously act on said operators and springs to simultaneously and variably adjust the response thereof corresponding to said given temperature level.

References Cited by the Examiner
UNITED STATES PATENTS 2,495,272   1/50   Lum _____ 236—1

FOREIGN PATENTS 709,445   8/31   France.
534,978   3/41   Great Britain.

EDWARD J. MICHAEL, *Primary Examiner.*

CHARLES SUKALO, *Examiner.*